US012692356B2

(12) United States Patent
Tang et al.

(10) Patent No.: US 12,692,356 B2
(45) Date of Patent: Jul. 28, 2026

(54) SILICONE RUBBER FOAM WITH ABLATION RESISTANCE AND HIGH-EFFICIENCY HEAT INSULATION AND PREPARATION METHOD THEREOF

(71) Applicant: HANGZHOU NORMAL UNIVERSITY, Hangzhou (CN)

(72) Inventors: Longcheng Tang, Hangzhou (CN); Guodong Zhang, Hangzhou (CN); Zuanyu Chen, Hangzhou (CN); Li Zhao, Hangzhou (CN); Lixiu Gong, Hangzhou (CN); Jiang Song, Hangzhou (CN)

(73) Assignee: HANGZHOU NORMAL UNIVERSITY, Hangzhou (CN)

( * ) Notice: Subject to any disclaimer, the term of this patent is extended or adjusted under 35 U.S.C. 154(b) by 550 days.

(21) Appl. No.: 18/214,838

(22) Filed: Jun. 27, 2023

(65) Prior Publication Data

US 2023/0416485 A1 Dec. 28, 2023

(30) Foreign Application Priority Data

| | | |
|---|---|---|
| Jun. 28, 2022 | (CN) | 202210749696.2 |
| May 9, 2023 | (CN) | 202310516165.3 |
| May 19, 2023 | (CN) | 202310569345.8 |

(51) Int. Cl.

| | |
|---|---|
| ***C08J 9/00*** | (2006.01) |
| ***C08G 77/08*** | (2006.01) |
| ***C08G 77/16*** | (2006.01) |
| ***C08G 77/20*** | (2006.01) |
| ***C08K 3/22*** | (2006.01) |
| ***C08K 3/34*** | (2006.01) |
| ***C08K 3/38*** | (2006.01) |
| ***C08K 3/40*** | (2006.01) |
| ***C08K 5/5419*** | (2006.01) |
| ***C08K 5/5425*** | (2006.01) |
| ***C08K 9/06*** | (2006.01) |

(52) U.S. Cl.

CPC ............ *C08J 9/0061* (2013.01); *C08G 77/08* (2013.01); *C08G 77/16* (2013.01); *C08G 77/20* (2013.01); *C08J 9/0023* (2013.01); *C08J 9/0066* (2013.01); *C08J 9/009* (2013.01); *C08J 9/0095* (2013.01); *C08K 3/22* (2013.01); *C08K 3/34* (2013.01); *C08K 3/38* (2013.01); *C08K 3/40* (2013.01); *C08K 5/5419* (2013.01); *C08K 5/5425* (2013.01); *C08K 9/06* (2013.01); *C08G 2330/00* (2013.01); *C08J 2383/06* (2013.01); *C08J 2383/07* (2013.01); *C08K 2003/2227* (2013.01); *C08K 2003/2231* (2013.01); *C08K 2003/2272* (2013.01); *C08K 2003/385* (2013.01); *C08K 2201/014* (2013.01)

(58) Field of Classification Search

CPC ........................................................ C08J 9/0061

See application file for complete search history.

(56) References Cited

U.S. PATENT DOCUMENTS

| | | | | |
|---|---|---|---|---|
| 4,851,452 A * | 7/1989 | Gross | C08L 83/04 | 521/154 |
| 5,008,305 A * | 4/1991 | Kennan | C09C 1/3081 | 106/490 |
| 2006/0178451 A1* | 8/2006 | Weller | C08K 9/06 | 428/405 |
| 2007/0054122 A1* | 3/2007 | Paisner | C09C 1/00 | 428/470 |
| 2013/0331821 A1* | 12/2013 | Okada | C09C 1/3081 | 604/525 |
| 2019/0367744 A1* | 12/2019 | Chevalier | C08L 83/04 | |

OTHER PUBLICATIONS

CN108219473 original (Year: 2018).*
CN108219473 Espacenet translation (Year: 2018).*
CN108219473, partial translation by USPTO translators (Year: 2018).*
CN115260765 original (Year: 2022).*
CN115260765 Espacenet translation (Year: 2022).*
CN115260765, Google translation (Year: 2022).*

* cited by examiner

*Primary Examiner* — Irina Krylova

(74) *Attorney, Agent, or Firm* — Notaro, Michalos & Zaccaria P.C.

(57) ABSTRACT

The present disclosure provides a room-temperature-vulcanizing (RTV) silicone rubber foam with ablation resistance and high-efficiency heat insulation and a preparation method thereof. In the present disclosure, hydroxyl-terminated polydimethylsiloxane, vinyl-terminated polydimethylsiloxane, a catalyst, an inhibitor, a ceramifiable emulsion foaming agent, a functionalized ceramic filler, and a heat-resistant additive are placed in a planetary stirring tank, and stirred to obtain a base rubber A. The hydroxyl-terminated polydimethylsiloxane, the vinyl-terminated polydimethylsiloxane, a hydrogen-containing silicone oil, a functionalized low-melting glass powder, and functionalized hexagonal boron nitride are placed in the planetary stirring tank, and stirred to obtain a base rubber B. The base rubber B is transferred to the base rubber A, vulcanization is conducted, followed by after vulcanization in an oven to obtain a final product.

11 Claims, No Drawings

SILICONE RUBBER FOAM WITH ABLATION RESISTANCE AND HIGH-EFFICIENCY HEAT INSULATION AND PREPARATION METHOD THEREOF

CROSS REFERENCE TO RELATED APPLICATION

This patent application claims the benefit and priority of Chinese Patent Application No. 2022107496962, filed with the China National Intellectual Property Administration on Jun. 28, 2022, Chinese Patent Application No. 2023105161653, filed with the China National Intellectual Property Administration on May 9, 2023, and Chinese Patent Application No. 2023105693458, filed with the China National Intellectual Property Administration on May 19, 2023, the disclosure of which of each is incorporated by reference herein in its entirety as part of the present application.

TECHNICAL FIELD

The present disclosure belongs to the technical field of organosilicon materials, and specifically relates to a silicone rubber foam with ablation resistance and high-efficiency heat insulation and a preparation method thereof.

BACKGROUND

Ceramicized silicone rubber foams have attracted great attention due to their high thermal stability, excellent fire resistance, and electrical insulation properties. Currently, the ceramicized silicone rubber foams are widely used in fields such as aerospace, electronics, nuclear industry, and power transmission. Ordinary flame-retardant polymer materials may form ash or molten droplets after being ablated by flames, and cannot play a role in fire prevention. However, ceramicized silicone rubber foams should form a hard ceramic after being attacked by long-term flame or high temperature. In addition, a porous structure of the ceramicized silicone rubber foam can block the transfer of heat, thereby protecting internal devices from the damage. Heat transfer includes three factors: heat conduction, heat convection, and heat radiation. The density and porous structure of a silicone rubber foam are two important factors affecting the heat insulation properties of this type of foam. Pure silicone rubber has a thermal conductivity of around 0.27 W/(m K), and the air thermal conductivity is generally much lower (0.024 W/(m K)) than that of other materials. Therefore, low-density silicone rubber foam has a better heat insulation effect; meanwhile, cells of a closed pore structure can block the heat convection caused by air temperature differences, thus further improving the heat insulation efficiency. Accordingly, it is possible to achieve high-efficiency flame retardancy and ceramization of the silicone rubber foams while taking into account low density and high closed porosity. This is an important research direction to improve the ablation resistance and heat insulation of silicone rubber foam materials.

Patent 201710799579.6 disclosed a ceramicized RTV silicone rubber foam sealant and a preparation method thereof. The sealant includes the following components: a, W-dihydroxy polydimethylsiloxane, precipitated silica, a mica powder, a ceramicization additive, a surface treatment agent, a vinyl silicone oil, a hydrogen-containing silicone oil, a catalyst, and a blowing promoter. The ceramicization additive is one or more selected from the group consisting of aluminum silicate, magnesium silicate, boric acid, zinc borate, a glass powder, and $TiO_2$. The ceramicized silicone rubber foam sealant has the excellent properties of a silicone foam sealant and forms a dense ceramic body under combustion or high-temperature conditions. The sealant shows a stable structure, stable fire resistance, and a desirable insulation performance. However, in this technology, the preparation of a foaming material requires a relatively high filler content via physical mixing method. Notably, a silicone rubber material has low ceramic forming efficiency, high viscosity, and poor processability, which lead to a high apparent density (0.48 $g/cm^3$ to 0.6 $g/cm^3$) of the foam material. This is not conducive to blocking the heat transfer and can hardly meet the demand for low-density materials under harsh conditions.

SUMMARY

Aiming at the excessive addition of ceramic fillers, poor processability, and high cell opening ratio and foam material density in the prior art, the present disclosure provides a silicone rubber foam with ablation resistance and high-efficiency heat insulation and a preparation method thereof. In the present disclosure, through the controllable assembly of a filler, silanization modification, and regulation of a mixing process, the mixing uniformity of a rubber material is improved, a foaming ratio and a closed porosity are increased, and a foam density is reduced to be 0.19-0.35 $g/cm^3$, which is not obtained in previous patents. The ceramifiable filler is assembled in situ to a foam surface through hydrosilylation condensation reaction and does not influence the viscosity of the prepolymer and thus has little effect on the foaming/cross-linking processes. When the surface is attacked by flames, the filler assembled on the foam surface can undergo rapid ceramicization to form a layer of dense ceramic structure. Meanwhile, an internal structure gradually forms a ceramic stable structure integrated with surface densification using a low-melting glass powder at a lower temperature when the flame further attacks, which can insulate flames and oxygen to prevent the burning of silicone rubber foam. In this way, there is an excellent processing technology of the rubber material with the addition of less filler, such that a matching performance of the rubber material vulcanization/foaming is improved when the materials are foamed, and the closed porosity of the foam material is further enhanced. As a result, high-efficiency ceramicization and flame retardancy of the silicon rubber foam can be achieved.

An objective of the present disclosure is to provide a silicone rubber foam with ablation resistance and high-efficiency heat insulation.

The present disclosure provides a silicone rubber foam with ablation resistance and high-efficiency heat insulation, including the following components in parts by weight for blending and foaming:

| | |
|---|---|
| hydroxyl-terminated polydimethylsiloxane | 100 parts; |
| vinyl-terminated polydimethylsiloxane | 20 parts to 60 parts; |
| a hydrogen-containing silicone oil | 20 parts to 40 parts; |
| a catalyst | 0.4 parts to 1.5 parts; |
| an inhibitor | 0.1 parts to 0.5 parts; |
| a ceramifiable emulsion foaming agent | 5 parts to 10 parts; |
| a functionalized ceramic filler | 3 parts to 15 parts; |
| a functionalized low-melting glass powder | 3 parts to 15 parts; |
| functionalized hexagonal boron nitride | 1 part to 5 parts; and |
| a heat-resistant additive | 1 part to 3 parts. |

Further, the hydroxyl-terminated poly dimethylsiloxane has a viscosity of 5,000 mPa·s to 20,000 mPa·s; the vinyl-terminated polydimethylsiloxane has a viscosity of 20,000 mPa·s to 50,000 mPa·s; and the hydrogen-containing silicone oil has a hydrogen content of 0.5% to 1.6%.

Further, the catalyst is a Karstedt's platinum catalyst with a chemical formula of $C_{24}H_{54}O_3PtSi_6$ and a concentration of 2,000 ppm to 5,000 ppm.

Further, the inhibitor is a silylene-propargyl compound with a structural formula as follows:

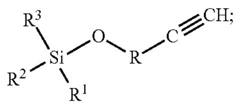

$R^1$, $R^2$, and $R^3$ each are selected from the group consisting of H, methyl, and ethyl, and R is selected from the group consisting of cyclohexyl and isopropyl.

Further, the ceramifiable emulsion foaming agent is a mixture of the following substances in arts by weight:

| | |
|---|---|
| hydroxyl-terminated polydimethylsiloxane | 100 parts; |
| an emulsifier | 5 parts to 15 parts; |
| a high-melting glass powder | 10 parts to 70 parts; |
| a ceramic filler | 10 parts to 70 parts; and |
| hydroxyl-modified hexagonal boron nitride | 10 parts to 20 parts. |

The emulsifier is one or more selected from the group consisting of Span 20, Span 60, and Span 80;

the hydroxyl-terminated polydimethylsiloxane has a viscosity of 1,500 mPa·s to 50,000 mPa·s;

the high-melting glass powder has a melting point of 650° C. to 900° C.;

the ceramic filler is one or more selected from the group consisting of montmorillonite, kaolin, wollastonite, and halloysite;

the hydroxyl-modified hexagonal boron nitride is obtained by treating hexagonal boron nitride at a high temperature of 900° C. to 1,200° C. for 0.6-2 h, cooling, and washing with deionized water; and the emulsifier and the hydroxyl-terminated polydimethylsiloxane are dissolved by heating in a water bath and mixed uniformly, and the high-melting glass powder, the ceramic filler, and the hydroxyl-modified hexagonal boron nitride are added into an obtained mixture and mixed uniformly to obtain the ceramifiable emulsion foaming agent. During the foaming, hydroxyl groups on a filler surface in the ceramifiable emulsion foaming agent react with the hydrogen-containing silicone oil to provide more foaming nucleation sites, thereby regulating self-assembly of the ceramic filler to the surface of the cells.

Further, the functionalized ceramic filler is obtained by grafting a ceramic filler with a silane coupling agent, and the ceramic filler is one or more selected from the group consisting of montmorillonite, kaolin, wollastonite, and halloysite;

the functionalized low-melting glass powder is obtained by grafting a low-melting glass powder with the silane coupling agent, and the low-melting glass powder has a melting point of 350° C. to 600° C.; and the addition of hexagonal boron nitride has two purposes: firstly, under normal flame (temperature less than 1750° C.) attack, the silicon foam gradually forms a ceramic structure, and hexagonal boron nitride has a lamellar structure to enhance the strength of the ceramic body; secondly, when the silicon foam is subjected to ultra-high temperature (temperature greater than 1750° C.) flame ablation, the silicon foam decomposes to form silica and the ceramic filler melts to form a protective liquid film, the high melting point of the boron nitride filler can increase the viscosity of the fused silica and other systems, thus effectively resisting flame washout and enhancing the stability of the foam skeleton structure.

The silane coupling agent was added to a 70%-80% ethanol aqueous solution, and a resulting mixture was adjusted to a pH value of 3-5 with glacial acetic acid at 60° C.-80° C. to fully hydrolyze the silane coupling agent; then ceramic filler, low-melting glass powder and hydroxyl-modified hexagonal boron nitride was added and treated for 2 h~6 h, adjusted to a pH value of 9-10 with ammonia water, washed with ethanol, and then dried to obtain the functionalized ceramic filler. Further, the silane coupling agent is selected from the group consisting of vinyltriethoxysilane, vinyltrimethoxysilane, and vinyltris(β-methoxyethoxy)silane.

Further, the heat-resistant additive is one or more selected from the group consisting of $SnO_2$, $Fe_2O_3$, $CeO_2$, and $Al_2O_3$.

Another objective of the present disclosure is to provide a preparation method of the silicone rubber foam with ablation resistance and high-efficiency heat insulation. The preparation method includes the following steps:

step (1), placing 50 parts by weight of the hydroxyl-terminated polydimethylsiloxane, 10 parts to 30 parts by weight of the vinyl-terminated polydimethylsiloxane, 0.4 parts to 1.5 parts by weight of the catalyst, 0.1 parts to 0.5 parts by weight of the inhibitor, 5 parts to 10 parts by weight of the ceramifiable emulsion foaming agent, 3 parts to 15 parts by weight of the functionalized ceramic filler, and 1 part to 3 parts by weight of the heat-resistant additive in a planetary stirring tank to obtain a rubber material A, turning on a cold circulation system to control a temperature of the rubber material A at 15° C. to 25° C., and stirring at a speed of 1,000 rad/min to 2,000 rad/min for 20 min to 30 min to obtain a base rubber A;

step (2), placing 50 parts by weight of the hydroxyl-terminated polydimethylsiloxane, 10 parts to 30 parts by weight of the vinyl-terminated polydimethylsiloxane, 20 parts to 40 parts by weight of the hydrogen-containing silicone oil, 3 parts to 15 parts by weight of the functionalized low-melting glass powder, and 1 part to 5 parts by weight of the functionalized hexagonal boron nitride in the planetary stirring tank to obtain a rubber material B, turning on the cold circulation system to control a temperature of the rubber material B at 15° C. to 25° C., and stirring at a speed of 1,000 rad/min to 2,000 rad/min for 20 min to 30 min to obtain a base rubber B;

step (3), transferring the base rubber B to the base rubber A to obtain a mixed rubber, turning on the cold circulation system, and stirring the mixed rubber at a speed of 4,000 rad/min to 6,000 rad/min for 1 min to 2 min; transferring an obtained mixed rubber to a mold, conducting vulcanization at a room temperature for 10 min to 20 min, followed by after vulcanization in an oven at 60° C. to 80° C. for 1 h to 2 h to obtain the RTV silicone rubber foam with ablation resistance and high-efficiency heat insulation. High-speed stirring introduces more air micronuclei, provides more bubble nucleation sites, and reduces foam density, which can also increase the closed porosity. In addition, when the hydrogen-containing silicone oil is added to the catalyst, a density difference allows the hydrogen-containing silicone oil to settle naturally, thus further improving a mixing efficiency.

The present disclosure relates to the in-situ assembly of filler and matches a specific mixing process. Assembling the functional filler effectively on a foam surface solves the problem that the silicone rubber foams need to be added with a high content of fillers to achieve ceramicization and flame retardancy. Moreover, this process reduces the foam density, improves the closed porosity and uniformity of the cells, and enhances the heat insulation performance of the foam. Compared with the prior art, the present disclosure has the following beneficial effects:

(1) In the present disclosure, the raw materials are self-assembled in situ by the filler during foaming and molding. When encountering flame attack, the foam surface and the internal backbone form a dense ceramicization under a temperature gradient, and silicon foam ceramicization can be realized by adding less functional filler. Therefore, the low-content filler can ensure a low viscosity of the rubber material and a high processing performance, thus resulting in a feature of low density of 0.19-0.35 g/cm$^3$. As a result, the prepared foam has a desirable heat insulating and flame-retardant performance, and can form a ceramic structure after encountering the flame attack with stable/dense properties and high strength.

(2) In the present disclosure, the preparation method optimizes the process and has a high mixing efficiency. The obtained product has uniform cells, high closed porosity, low foam density, and desirable heat insulation performance.

DETAILED DESCRIPTION OF THE EMBODIMENTS

The present disclosure will be further described below in conjunction with specific examples. All fractions in the following examples and comparative examples are in parts by weight. It should be understood that these examples are only intended to illustrate the present disclosure and not to limit the scope of the present disclosure. In the following examples, the experimental methods in which specific conditions are not stated are generally carried out according to conventional conditions or according to the conditions recommended by the manufacturer.

Example 1

A vinyltriethoxysilane coupling agent was grafted onto montmorillonite to obtain a functionalized ceramic filler: 0.15 parts of the vinyltriethoxysilane coupling agent was added to a 70% ethanol aqueous solution, and a resulting mixture was adjusted to a pH value of 4 with glacial acetic acid at 80° C. to fully hydrolyze the silane coupling agent; 3 parts of the montmorillonite was added and treated for 6 h, adjusted to a pH value of 9.5 with ammonia water, washed with ethanol, and then dried to obtain the functionalized ceramic filler.

The vinyltriethoxysilane coupling agent was grafted onto a glass powder with a melting point of 500° C. to obtain a functionalized low-melting glass powder: 0.15 parts of the vinyltriethoxysilane coupling agent was added to a 70% ethanol aqueous solution, and a resulting mixture was adjusted to a pH value of 4 with glacial acetic acid at 80° C. to fully hydrolyze the silane coupling agent; 3 parts of the glass powder was added and treated for 6 h, adjusted to a pH value of 9.5 with ammonia water, washed with ethanol, and then dried to obtain the functionalized low-melting glass powder.

Hexagonal boron nitride was treated at a high temperature of 1,000° C. for 1 h, cooled, and washed with deionized water to obtain hydroxyl-modified hexagonal boron nitride.

The vinyltriethoxysilane coupling agent was grafted onto the hydroxyl-modified hexagonal boron nitride to obtain functionalized hexagonal boron nitride: 0.05 parts of the vinyltriethoxysilane coupling agent was added to a 70% ethanol aqueous solution, and a resulting mixture was adjusted to a pH value of 4 with glacial acetic acid at 80° C. to fully hydrolyze the silane coupling agent; 1 part of the hydroxyl-modified hexagonal boron nitride was added and treated for 6 h, adjusted to a pH value of 9.5 with ammonia water, washed with ethanol, and then dried to obtain the functionalized hexagonal boron nitride.

An RTV silicone rubber foam with ablation resistance and high-efficiency heat insulation was prepared as follows:

Step (1), 50 parts of the hydroxyl-terminated polydimethylsiloxane with a viscosity of 10,000 mPa s, 10 parts of the vinyl-terminated polydimethylsiloxane with a viscosity of 20,000 mPa s, 1.5 parts of a Karstedt's platinum catalyst $C_{24}H_{54}O_3PtSi_6$ with a concentration of 2,000 ppm, 0.2 parts of an inhibitor, 5 parts of the ceramifiable emulsion foaming agent, 3 parts of the functionalized ceramic filler, and 1 part of a heat-resistant additive $SnO_2$ were placed in a planetary stirring tank to obtain a rubber material A, a cold circulation system was turned on to control a temperature of the rubber material A at 15° C., and the rubber material A was stirred at a speed of 1,000 rad/min for 30 min to obtain a base rubber A. The inhibitor was a silylene-propargyl compound with a structural formula as follows:

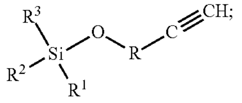

R$^1$, R$^2$, and R$^3$ were H, and R was cyclohexyl.

Step (2), 50 parts of the hydroxyl-terminated polydimethylsiloxane with a viscosity of 10,000 mPa·s, 10 parts of the vinyl-terminated polydimethylsiloxane with a viscosity of 20,000 mPa·s, 40 parts of a hydrogen-containing silicone oil with a hydrogen content of 0.5%, 3 parts of the functionalized low-melting glass powder, and 1 part of the functionalized hexagonal boron nitride were placed in the planetary stirring tank to obtain a rubber material B, a cold circulation system was turned on to control a temperature of the rubber material B at 15° C., and the rubber material B was stirred at a speed of 1,000 rad/min for 30 min to obtain a base rubber B.

Step (3), the base rubber B was transferred to the base rubber A to obtain a mixed rubber, the cold circulation system was turned on, and the mixed rubber was stirred at a speed of 4,000 rad/min for 2 min: an obtained mixed rubber was transferred to a mold, vulcanization was conducted at a room temperature for 15 min, followed by after vulcanization in an oven at 60° C. for 2 h to obtain the RTV silicone rubber foam with ablation resistance and high-efficiency heat insulation.

Example 2

A vinyltrimethoxysilane coupling agent was grafted onto kaolin to obtain a functionalized ceramic filler: 0.1 parts of the vinyltrimethoxysilane coupling agent was added to a 75% ethanol aqueous solution, and a resulting mixture was adjusted to a pH value of 3 with glacial acetic acid at 75° C. to fully hydrolyze the silane coupling agent: 4 parts of the kaolin was added and treated for 5 h, adjusted to a pH value of 9.0 with ammonia water, washed with ethanol, and then dried to obtain the functionalized ceramic filler.

The vinyltrimethoxysilane coupling agent was grafted onto a glass powder with a melting point of 400° C. to obtain a functionalized low-melting glass powder: 0.1 parts of the vinyltrimethoxysilane coupling agent was added to a 75% ethanol aqueous solution, and a resulting mixture was adjusted to a pH value of 3 with glacial acetic acid at 75° C. to fully hydrolyze the silane coupling agent: 4 parts of the glass powder was added and treated for 5 h, adjusted to a pH value of 9.0 with ammonia water, washed with ethanol, and then dried to obtain the functionalized low-melting glass powder.

Hexagonal boron nitride was treated at a high temperature of 900° C. for 2 h, cooled, and washed with deionized water to obtain hydroxyl-modified hexagonal boron nitride.

The vinyltrimethoxysilane coupling agent was grafted onto the hydroxyl-modified hexagonal boron nitride to obtain functionalized hexagonal boron nitride: 0.06 parts of the vinyltrimethoxysilane coupling agent was added to a 75% ethanol aqueous solution, and a resulting mixture was adjusted to a pH value of 3 with glacial acetic acid at 75° C. to fully hydrolyze the silane coupling agent; 1.5 parts of the hydroxyl-modified hexagonal boron nitride was added and treated for 5 h, adjusted to a pH value of 9.0 with ammonia water, washed with ethanol, and then dried to obtain the functionalized hexagonal boron nitride.

8 parts of Span 60 and 100 parts of hydroxyl-terminated polydimethylsiloxane with a viscosity of 1,500 mPa·s were dissolved by heating in a water bath and mixed uniformly, and 30 parts of a glass powder with a melting point of 750° C., 30 parts of montmorillonite, 40 parts of kaolin, and 15 parts of the hydroxyl-modified hexagonal boron nitride were mixed uniformly to obtain a ceramifiable emulsion foaming agent.

An RTV silicone rubber foam with ablation resistance and high-efficiency heat insulation was prepared as follows:

Step (1), 50 parts of the hydroxyl-terminated polydimethylsiloxane with a viscosity of 5,000 mPa s, 30 parts of the vinyl-terminated polydimethylsiloxane with a viscosity of 30,000 mPa s, 1.2 parts of a Karstedt's platinum catalyst $C_{24}H_{54}O_3PtSi_6$ with a concentration of 2,500 ppm, 0.1 parts of an inhibitor, 6 parts of the ceramifiable emulsion foaming agent, 4 parts of the functionalized ceramic filler, and 1.2 parts of a heal-resistant additive $Fe_2O_3$ were placed in a planetary stirring tank to obtain a rubber material A, a cold circulation system was turned on to control a temperature of the rubber material A at 16° C., and the rubber material A was stirred at a speed of 1,200 rad/min for 25 min to obtain a base rubber A. The inhibitor was a silylene-propargyl compound with a structural formula as follows:

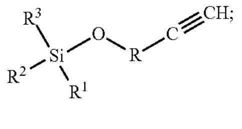

$R^1$, $R^2$, and $R^3$ were methyl, and R was isopropyl.

Step (2), 50 parts of the hydroxyl-terminated polydimethylsiloxane with a viscosity of 5,000 mPa·s, 30 parts of the vinyl-terminated polydimethylsiloxane with a viscosity of 30,000 mPa·s, 36 parts of a hydrogen-containing silicone oil with a hydrogen content of 0.6%, 4 parts of the functionalized low-melting glass powder, and 1.5 parts of the functionalized hexagonal boron nitride were placed in the planetary stirring tank to obtain a rubber material B, a cold circulation system was turned on to control a temperature of the rubber material B at 18° C., and the rubber material B was stirred at a speed of 1,200 rad/min for 28 min to obtain a base rubber B.

Step (3), the base rubber B was transferred to the base rubber A to obtain a mixed rubber, the cold circulation system was turned on, and the mixed rubber was stirred at a speed of 4,200 rad/min for 100 s; an obtained mixed rubber was transferred to a mold, vulcanization was conducted at a room temperature for 10 min, followed by after vulcanization in an oven at 70° C. for 2 h to obtain the RTV silicone rubber foam with ablation resistance and high-efficiency heat insulation.

Example 3

A vinyltris(β-methoxyethoxy)silane coupling agent was grafted onto wollastonite to obtain a functionalized ceramic filler: 0.1 parts of the vinyltris(β-methoxyethoxy)silane coupling agent was added to a 80% ethanol aqueous solution, and a resulting mixture was adjusted to a pH value of 5 with glacial acetic acid at 70° C. to fully hydrolyze the silane coupling agent; 5 parts of the wollastonite was added and treated for 2 h, adjusted to a pH value of 9.8 with ammonia water, washed with ethanol, and then dried to obtain the functionalized ceramic filler.

The vinyltrimethoxysilane coupling agent was grafted onto a glass powder with a melting point of 450° C. to obtain a functionalized low-melting glass powder: 0.1 parts of the vinyltrimethoxysilane coupling agent was added to a 80% ethanol aqueous solution, and a resulting mixture was adjusted to a pH value of 5 with glacial acetic acid at 70° C. to fully hydrolyze the silane coupling agent: 5 parts of the glass powder was added and treated for 2 h, adjusted to a pH value of 9.8 with ammonia water, washed with ethanol, and then dried to obtain the functionalized low-melting glass powder.

Hexagonal boron nitride was treated at a high temperature of 1,200° C. for 0.5 h, cooled, and washed with deionized water to obtain hydroxyl-modified hexagonal boron nitride.

The vinyltriethoxysilane coupling agent was grafted onto the hydroxyl-modified hexagonal boron nitride to obtain functionalized hexagonal boron nitride: 0.06 parts of the vinyltriethoxysilane coupling agent was added to a 80% ethanol aqueous solution, and a resulting mixture was adjusted to a pH value of 5 with glacial acetic acid at 70° C. to fully hydrolyze the silane coupling agent: 2 part of the hydroxyl-modified hexagonal boron nitride was added and treated for 2 h, adjusted to a pH value of 9.8 with ammonia water, washed with ethanol, and then dried to obtain the functionalized hexagonal boron nitride.

10 parts of Span 80 and 100 parts of hydroxyl-terminated polydimethylsiloxane with a viscosity of 5,000 mPa·s were dissolved by heating in a water bath and mixed uniformly, and 70 parts of a glass powder with a melting point of 700° C., 10 parts of kaolin, and 20 parts of the hydroxyl-modified hexagonal boron nitride were mixed uniformly to obtain a ceramifiable emulsion foaming agent.

An RTV silicone rubber foam with ablation resistance and high-efficiency heat insulation was prepared as follows:

Step (1), 50 parts of the hydroxyl-terminated polydimethylsiloxane with a viscosity of 20,000 mPa s, 12 parts of the vinyl-terminated polydimethylsiloxane with a viscosity of 40,000 mPa s, 1 part of a Karstedt's platinum catalyst $C_{24}H_{54}O_3PtSi_6$ with a concentration of 3,000 ppm, 0.3 parts of an inhibitor, 7 parts of the ceramifiable emulsion foaming agent, 5 parts of the functionalized ceramic filler, and 1.5 parts of a heat-resistant additive $CeO_2$ were placed in a planetary stirring tank to obtain a rubber material A, a cold circulation system was turned on to control a temperature of the rubber material A at 18° C., and the rubber material A was stirred at a speed of 1,500 rad/min for 22 min to obtain a base rubber A. The inhibitor was a silylene-propargyl compound with a structural formula as follows:

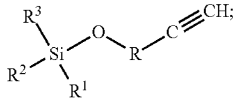

$R^1$, $R^2$, and $R^3$ were ethyl, and R was cyclohexyl.

Step (2), 50 parts of the hydroxyl-terminated polydimethylsiloxane with a viscosity of 20,000 mPa·s, 12 parts of the vinyl-terminated polydimethylsiloxane with a viscosity of 40,000 mPa·s, 32 parts of a hydrogen-containing silicone oil with a hydrogen content of 0.8%, 5 parts of the functionalized low-melting glass powder, and 2 parts of the functionalized hexagonal boron nitride were placed in the planetary stirring tank to obtain a rubber material B, a cold circulation system was turned on to control a temperature of the rubber material B at 20° C., and the rubber material B was stirred at a speed of 1,300 rad/min for 26 min to obtain a base rubber B.

Step (3), the base rubber B was transferred to the base rubber A to obtain a mixed rubber, the cold circulation system was turned on, and the mixed rubber was stirred at a speed of 4,500 rad/min for 80 s; an obtained mixed rubber was transferred to a mold, vulcanization was conducted at a room temperature for 12 min, followed by after vulcanization in an oven at 70° C. for 1 h and 45 min to obtain the RTV silicone rubber foam with ablation resistance and high-efficiency heat insulation.

Example 4

A vinyltrimethoxysilane coupling agent was grafted onto montmorillonite and kaolin at a weight ratio of 2:3 to obtain a functionalized ceramic filler: 0.2 parts of the vinyltrimethoxysilane coupling agent was added to a 72% ethanol aqueous solution, and a resulting mixture was adjusted to a pH value of 3.5 with glacial acetic acid at 78° C. to fully hydrolyze the silane coupling agent: 2.4 parts of the montmorillonite and 3.6 parts of the kaolin were added and treated for 3 h, adjusted to a pH value of 10.0 with ammonia water, washed with ethanol, and then dried to obtain the functionalized ceramic filler.

The vinyltrimethoxysilane coupling agent was grafted onto a glass powder with a melting point of 600° C. to obtain a functionalized low-melting glass powder: 0.2 parts of the vinyltrimethoxysilane coupling agent was added to a 72% ethanol aqueous solution, and a resulting mixture was adjusted to a pH value of 3.5 with glacial acetic acid at 78° C. to fully hydrolyze the silane coupling agent: 6 parts of the glass powder was added and treated for 3 h, adjusted to a pH value of 10.0 with ammonia water, washed with ethanol, and then dried to obtain the functionalized low-melting glass powder.

Hexagonal boron nitride was treated at a high temperature of 1,100° C. for 50 min, cooled, and washed with deionized water to obtain hydroxyl-modified hexagonal boron nitride.

The vinyltris(β-methoxyethoxy)silane coupling agent was grafted onto the hydroxyl-modified hexagonal boron nitride to obtain functionalized hexagonal boron nitride: 0.05 parts of the vinyltris(β-methoxyethoxy)silane coupling agent was added to a 72% ethanol aqueous solution, and a resulting mixture was adjusted to a pH value of 3.5 with glacial acetic acid at 78° C. to fully hydrolyze the silane coupling agent: 2.5 part of the hydroxyl-modified hexagonal boron nitride was added and treated for 3 h, adjusted to a pH value of 10.0 with ammonia water, washed with ethanol, and then dried to obtain the functionalized hexagonal boron nitride.

6 parts of Span 20, 6 parts of Span 60, and 100 parts of hydroxyl-terminated polydimethylsiloxane with a viscosity of 10,000 mPa·s were dissolved by heating in a water bath and mixed uniformly, and 50 parts of a glass powder with a melting point of 650° C. 50 parts of wollastonite, and 18 parts of the hydroxyl-modified hexagonal boron nitride were mixed uniformly to obtain a ceramifiable emulsion foaming agent.

An RTV silicone rubber foam with ablation resistance and high-efficiency heat insulation was prepared as follows:

Step (1), 50 parts of the hydroxyl-terminated polydimethylsiloxane with a viscosity of 15,000 mPa s, 15 parts of the vinyl-terminated polydimethylsiloxane with a viscosity of 50,000 mPa s, 0.8 parts of a Karstedt's platinum catalyst $C_{24}H_{54}O_3PtSi_6$ with a concentration of 3,500 ppm, 0.4 parts of an inhibitor, 8 parts of the ceramifiable emulsion foaming agent, 6 parts of the functionalized ceramic filler, and 3 parts of a heat-resistant additive $Al_2O_3$ were placed in a planetary stirring tank to obtain a rubber material A, a cold circulation system was turned on to control a temperature of the rubber material A at 20° C., and the rubber material A was stirred at a speed of 1,600 rad/min for 20 min to obtain a base rubber A. The inhibitor was a silylene-propargyl compound with a structural formula as follows:

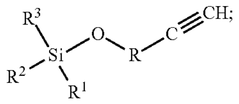

$R^1$, $R^2$, and $R^3$ were H, and R was isopropyl.

Step (2), 50 parts of the hydroxyl-terminated polydimethylsiloxane with a viscosity of 10,000 mPa·s, 10 parts of the vinyl-terminated polydimethylsiloxane with a viscosity of 20,000 mPa·s, 30 parts of a hydrogen-containing silicone oil with a hydrogen content of 1%, 6 parts of the functionalized low-melting glass powder, and 2.5 parts of the functionalized hexagonal boron nitride were placed in the planetary stirring tank to obtain a rubber material B, a cold circulation system was turned on to control a temperature of the rubber material B at 22° C., and the rubber material B was stirred at a speed of 1,500 rad/min for 24 min to obtain a base rubber B.

Step (3), the base rubber B was transferred to the base rubber A to obtain a mixed rubber, the cold circulation system was turned on, and the mixed rubber was stirred at a speed of 5,000 rad/min for 70 s: an obtained mixed rubber was transferred to a mold, vulcanization was conducted at a room temperature for 16 min, followed by after vulcanization in an oven at 65° C. for 1 h and 50 min to obtain the RTV silicone rubber foam with ablation resistance and high-efficiency heat insulation.

Example 5

A vinyltriethoxysilane coupling agent was grafted onto halloysite to obtain a functionalized ceramic filler: 0.1 parts of the vinyltriethoxysilane coupling agent was added to a 78% ethanol aqueous solution, and a resulting mixture was adjusted to a pH value of 4.5 with glacial acetic acid at 72° C. to fully hydrolyze the silane coupling agent: 8 parts of the halloysite was added and treated for 4 h, adjusted to a pH value of 9.2 with ammonia water, washed with ethanol, and then dried to obtain the functionalized ceramic filler.

The vinyltrimethoxysilane coupling agent was grafted onto a glass powder with a melting point of 580° C. to obtain a functionalized low-melting glass powder: 0.1 parts of the vinyltrimethoxysilane coupling agent was added to a 78% ethanol aqueous solution, and a resulting mixture was adjusted to a pH value of 4.5 with glacial acetic acid at 72° C. to fully hydrolyze the silane coupling agent: 8 parts of the glass powder was added and treated for 4 h, adjusted to a pH value of 9.2 with ammonia water, washed with ethanol, and then dried to obtain the functionalized low-melting glass powder.

Hexagonal boron nitride was treated at a high temperature of 1,150° C. for 45 min, cooled, and washed with deionized water to obtain hydroxyl-modified hexagonal boron nitride.

The vinyltrimethoxysilane coupling agent was grafted onto the hydroxyl-modified hexagonal boron nitride to obtain functionalized hexagonal boron nitride: 0.03 parts of the vinyltrimethoxysilane coupling agent was added to a 78% ethanol aqueous solution, and a resulting mixture was adjusted to a pH value of 4.5 with glacial acetic acid at 72° C. to fully hydrolyze the silane coupling agent, 3 parts of the hydroxyl-modified hexagonal boron nitride was added and treated for 4 h, adjusted to a pH value of 9.2 with ammonia water, washed with ethanol, and then dried to obtain the functionalized hexagonal boron nitride.

5 parts of Span 20, 5 parts of Span 60, 5 parts of Span 80, and 100 parts of hydroxyl-terminated polydimethylsiloxane with a viscosity of 50,000 mPa·s were dissolved by heating in a water bath and mixed uniformly, and 40 parts of a glass powder with a melting point of 800° C., 60 parts of halloysite, and 12 parts of the hydroxyl-modified hexagonal boron nitride were added into an obtained mixture and mixed uniformly to obtain a ceramifiable emulsion foaming agent.

An RTV silicone rubber foam with ablation resistance and high-efficiency heat insulation was prepared as follows:

Step (1), 50 parts of the hydroxyl-terminated polydimethylsiloxane with a viscosity of 18,000 mPa s, 18 parts of the vinyl-terminated polydimethylsiloxane with a viscosity of 25,000 mPa s, 0.6 parts of a Karstedt's platinum catalyst $C_{24}H_{54}O_3PtSi_6$ with a concentration of 4,000 ppm, 0.5 parts of an inhibitor, 9 parts of the ceramifiable emulsion foaming agent, 8 parts of the functionalized ceramic filler, and 1 part of a heat-resistant additive $SnO_2$ and 1 part of a heat-resistant additive $Fe_2O_3$ were placed in a planetary stirring tank to obtain a rubber material A, a cold circulation system was turned on to control a temperature of the rubber material A at 22° C., and the rubber material A was stirred at a speed of 1,800 rad/min for 24 min to obtain a base was a silylene-propargyl compound with a structural formula as follows:

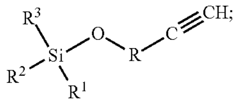

$R^1$, $R^2$, and $R^3$ were ethyl, and R was cyclohexyl.

Step (2), 50 parts of the hydroxyl-terminated polydimethylsiloxane with a viscosity of 8,000 mPa·s, 20 parts of the vinyl-terminated polydimethylsiloxane with a viscosity of 12,000 mPa·s, 25 parts of a hydrogen-containing silicone oil with a hydrogen content of 1.2%, 8 parts of the functionalized low-melting glass powder, and 3 parts of the functionalized hexagonal boron nitride were placed in the planetary stirring tank to obtain a rubber material B, a cold circulation system was turned on to control a temperature of the rubber material B at 24° C., and the rubber material B was stirred at a speed of 1,600 rad/min for 22 min to obtain a base rubber B.

Step (3), the base rubber B was transferred to the base rubber A to obtain a mixed rubber, the cold circulation system was turned on, and the mixed rubber was stirred at a speed of 5,400 rad/min for 2 min; an obtained mixed rubber was transferred to a mold, vulcanization was conducted at a room temperature for 18 min, followed by after vulcanization in an oven at 80° C. for 1 h and 15 min to obtain the RTV silicone rubber foam with ablation resistance and high-efficiency heat insulation.

Example 6

A vinyltris(β-methoxyethoxy)silane coupling agent was grafted onto wollastonite and halloysite with a weight ratio of 3:1 to obtain a functionalized ceramic filler: 0.1 parts of the vinyltris(β-methoxyethoxy)silane coupling agent was added to a 75% ethanol aqueous solution, and a resulting mixture was adjusted to a pH value of 4.2 with glacial acetic acid at 72° C. to fully hydrolyze the silane coupling agent; 7.5 parts of the wollastonite and 2.5 parts of the halloysite were added and treated for 4.5 h, adjusted to a pH value of 9.6 with ammonia water, washed with ethanol, and then dried to obtain the functionalized ceramic filler.

The vinyltris(β-methoxyethoxy)silane coupling agent was grafted onto a glass powder with a melting point of 550° C. to obtain a functionalized low-melting glass powder: 0.1 parts of the vinyltris(β-methoxyethoxy)silane coupling agent was added to a 75% ethanol aqueous solution, and a resulting mixture was adjusted to a pH value of 42 with glacial acetic acid at 72° C. to fully hydrolyze the silane coupling agent; 10 parts of the glass powder was added and treated for 4.5 h, adjusted to a pH value of 9.6 with ammonia water, washed with ethanol, and then dried to obtain the functionalized low-melting glass powder.

Hexagonal boron nitride was treated at a high temperature of 1,050° C. for 80 min, cooled, and washed with deionized water to obtain hydroxyl-modified hexagonal boron nitride.

The vinyltris(β-methoxyethoxy)silane coupling agent was grafted onto the hydroxyl-modified hexagonal boron nitride to obtain functionalized hexagonal boron nitride: 0.1 parts of the vinyltris(β-methoxyethoxy)silane coupling agent was added to a 75% ethanol aqueous solution, and a resulting mixture was adjusted to a pH value of 4.2 with glacial acetic acid at 72° C. to fully hydrolyze the silane coupling agent: 3.5 part of the hydroxyl-modified hexagonal boron nitride was added and treated for 4.5 h, adjusted to a pH value of 9.6 with ammonia water, washed with ethanol, and then dried to obtain the functionalized hexagonal boron nitride.

6 parts of Span 20 and 100 parts of hydroxyl-terminated polydimethylsiloxane with a viscosity of 30,000 mPa·s were dissolved by heating in a water bath and mixed uniformly, and 20 parts of a glass powder with a melting point of 850° C., 20 parts of wollastonite, 10 parts of halloysite, and 10 parts of hydroxyl-modified hexagonal boron nitride were added into an obtained mixture and mixed uniformly to obtain a ceramifiable emulsion foaming agent.

An RTV silicone rubber foam with ablation resistance and high-efficiency heat insulation was prepared as follows:

Step (1), 50 parts of the hydroxyl-terminated polydimethylsiloxane with a viscosity of 8,000 mPa s, 20 parts of the vinyl-terminated polydimethylsiloxane with a viscosity of 35,000 mPa s, 0.5 parts of a Karstedt's platinum catalyst $C_{24}H_{54}O_3PtSi_6$ with a concentration of 4,500 ppm, 0.4 parts of an inhibitor, 10 parts of the ceramifiable emulsion foaming agent, 10 parts of the functionalized ceramic filler, and 2.5 parts of a heat-resistant additive $SnO_2$ were placed in a planetary stirring tank to obtain a rubber material A, a cold circulation system was turned on to control a temperature of the rubber material A at 24° C., and the rubber material A was stirred at a speed of 1,000 rad/min for 30 min to obtain a base rubber A. The inhibitor was a silylene-propargyl compound with a structural formula as follows:

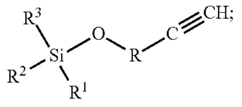

$R^1$, $R^2$, and $R^3$ were H, and R was cyclohexyl.

Step (2), 50 parts of the hydroxyl-terminated polydimethylsiloxane with a viscosity of 12,000 mPa·s, 30 parts of the vinyl-terminated polydimethylsiloxane with a viscosity of 40,000 mPa·s, 24 parts of a hydrogen-containing silicone oil with a hydrogen content of 1.3%, 10 parts of the functionalized low-melting glass powder, and 3.5 parts of the functionalized hexagonal boron nitride were placed in the planetary stirring tank to obtain a rubber material B, a cold circulation system was turned on to control a temperature of the rubber material B at 25° C., and the rubber material B was stirred at a speed of 1,800 rad/min for 21 min to obtain a base rubber B.

Step (3), the base rubber B was transferred to the base rubber A to obtain a mixed rubber, the cold circulation system was turned on, and the mixed rubber was stirred at a speed of 5,500 rad/min for 1 min: an obtained mixed rubber was transferred to a mold, vulcanization was conducted at a room temperature for 20 min, followed by after vulcanization in an oven at 75° C. for 1 h to obtain the RTV silicone rubber foam with ablation resistance and high-efficiency heat insulation.

Example 7

A vinyltriethoxvsilane coupling agent was grafted onto wollastonite to obtain a functionalized ceramic filler: 0.2 parts of the vinyltriethoxysilane coupling agent was added to a 75% ethanol aqueous solution, and a resulting mixture was adjusted to a pH value of 3.2 with glacial acetic acid at 75° C. to fully hydrolyze the silane coupling agent; 12 parts of the wollastonite was added and treated for 3.5 h, adjusted to a pH value of 9.1 with ammonia water, washed with ethanol, and then dried to obtain the functionalized ceramic filler.

The vinyltris(β-methoxyethoxy)silane coupling agent was grafted onto a glass powder with a melting point of 350° C. to obtain a functionalized low-melting glass powder: 0.2 parts of the vinyltris(β-methoxyethoxy)silane coupling agent was added to a 75% ethanol aqueous solution, and a resulting mixture was adjusted to a pH value of 3.2 with glacial acetic acid at 75° C. to fully hydrolyze the silane coupling agent: 12 parts of the glass powder was added and treated for 3.5 h, adjusted to a pH value of 9.1 with ammonia water, washed with ethanol, and then dried to obtain the functionalized low-melting glass powder.

Hexagonal boron nitride was treated at a high temperature of 980° C. for 90 min, cooled, and washed with deionized water to obtain hydroxyl-modified hexagonal boron nitride.

The vinyltriethoxysilane coupling agent was grafted onto the hydroxyl-modified hexagonal boron nitride to obtain functionalized hexagonal boron nitride: 0.1 parts of the vinyltriethoxysilane coupling agent was added to a 75% ethanol aqueous solution, and a resulting mixture was adjusted to a pH value of 3.2 with glacial acetic acid at 75° C. to fully hydrolyze the silane coupling agent; 5 part of the hydroxyl-modified hexagonal boron nitride was added and treated for 3.5 h, adjusted to a pH value of 9.1 with ammonia water, washed with ethanol, and then dried to obtain the functionalized hexagonal boron nitride.

9 parts of Span 60 and 100 parts of hydroxyl-terminated polydimethylsiloxane with a viscosity of 3,000 mPa·s were dissolved by heating in a water bath and mixed uniformly, and 10 parts of a glass powder with a melting point of 680° C., 15 parts of montmorillonite, 15 parts of kaolin, 15 parts of wollastonite, 15 parts of halloysite, and 15 parts of the hydroxyl-modified hexagonal boron nitride were added into an obtained mixture and mixed uniformly to obtain a ceramifiable emulsion foaming agent.

An RTV silicone rubber foam with ablation resistance and high-efficiency heat insulation was prepared as follows:

Step (1), 50 parts of the hydroxyl-terminated polydimethylsiloxane with a viscosity of 12,000 mPa s, 25 parts of the vinyl-terminated polydimethylsiloxane with a viscosity of 45,000 mPa s, 0.4 parts of a Karstedt's platinum catalyst $C_{24}H_{54}O_3PtSi_6$ with a concentration of 5,000 ppm, 0.3 parts of an inhibitor, 6.5 parts of the ceramifiable emulsion foaming agent, 12 parts of the functionalized ceramic filler, and 1 part of a heat-resistant additive $SnO_2$, 1 part of a heat-resistant additive $CeO_2$ and 1 part of a heat-resistant additive $Al_2O_3$ were placed in a planetary stirring tank to obtain a rubber material A, a cold circulation system was turned on to control a temperature of the rubber material A at 25° C., and the rubber material A was stirred at a speed of 2,000 rad/min for 20 min to obtain a base rubber A. The inhibitor was a silylene-propargyl compound with a structural formula as follows:

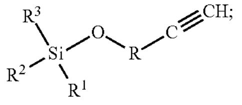

$R^1$, $R^2$, and $R^3$ were methyl, and R was isopropyl.

Step (2), 50 parts of the hydroxyl-terminated polydimethylsiloxane with a viscosity of 9,000 mPa·s, 16 parts of the vinyl-terminated polydimethylsiloxane with a viscosity of 25,000 mPa·s, 20 parts of a hydrogen-containing silicone oil with a hydrogen content of 1.6%, 12 parts of the functionalized low-melting glass powder, and 5 parts of the functionalized hexagonal boron nitride were placed in the planetary stirring tank to obtain a rubber material B, a cold circulation system was turned on to control a temperature of the rubber material B at 20° C., and the rubber material B was stirred at a speed of 2,000 rad/min for 20 min to obtain a base rubber B.

Step (3), the base rubber B was transferred to the base rubber A to obtain a mixed rubber, the cold circulation system was turned on, and the mixed rubber was stirred at a speed of 6000 rad/min for 1 min: an obtained mixed rubber was transferred to a mold, vulcanization was conducted at a room temperature for 15 min, followed by after vulcanization in an oven at 78° C. for 1 h to obtain the RTV silicone rubber foam with ablation resistance and high-efficiency heat insulation.

Example 8

A vinyltrimethoxysilane coupling agent was grafted onto montmorillonite to obtain a functionalized ceramic filler: 0.5 parts of the vinyltrimethoxysilane coupling agent was added to a 75% ethanol aqueous solution, and a resulting mixture was adjusted to a pH value of 3.4 with glacial acetic acid at 75° C. to fully hydrolyze the silane coupling agent: 15 parts of the montmorillonite was added and treated for 2.5 h, adjusted to a pH value of 9.7 with ammonia water, washed with ethanol, and then dried to obtain the functionalized ceramic filler.

The vinyltriethoxysilane coupling agent was grafted onto a glass powder with a melting point of 420° C. to obtain a functionalized low-melting glass powder: 0.5 parts of the vinyltriethoxysilane coupling agent was added to a 75% ethanol aqueous solution, and a resulting mixture was adjusted to a pH value of 3.4 with glacial acetic acid at 75° C. to fully hydrolyze the silane coupling agent; 15 parts of the glass powder was added and treated for 2.5 h, adjusted to a pH value of 9.7 with ammonia water, washed with ethanol, and then dried to obtain the functionalized low-melting glass powder.

Hexagonal boron nitride was treated at a high temperature of 950° C. for 100 mm, cooled, and washed with deionized water to obtain hydroxyl-modified hexagonal boron nitride.

The vinyltris(β-methoxyethoxy)silane coupling agent was grafted onto the hydroxyl-modified hexagonal boron nitride to obtain functionalized hexagonal boron nitride: 0.1 parts of the vinyltris(β-methoxyethoxy)silane coupling agent was added to a 75% ethanol aqueous solution, and a resulting mixture was adjusted to a pH value of 3.4 with glacial acetic acid at 75° C. to fully hydrolyze the silane coupling agent; 4.5 part of the hydroxyl-modified hexagonal boron nitride was added and treated for 2.5 h, adjusted to a pH value of 9.7 with ammonia water, washed with ethanol, and then dried to obtain the functionalized hexagonal boron nitride.

7 parts of Span 20, 7 parts of Span 60, and 100 parts of hydroxyl-terminated polydimethylsiloxane with a viscosity of 15,000 mPa·s were dissolved by heating in a water bath and mixed uniformly, and 50 parts of a glass powder with a melting point of 780° C., 50 parts of kaolin, and 18 parts of hydroxyl-modified hexagonal boron nitride were added into an obtained mixture and mixed uniformly to obtain a ceramifiable emulsion foaming agent.

An RTV silicone rubber foam with ablation resistance and high-efficiency heat insulation was prepared as follows:

Step (1), 50 parts of the hydroxyl-terminated polydimethylsiloxane with a viscosity of 6,000 mPa s, 28 parts of the vinyl-terminated polydimethylsiloxane with a viscosity of 18,000 mPa s, 1.1 parts of a Karstedt's platinum catalyst $C_{24}H_{54}O_3PtSi_6$ with a concentration of 3,600 ppm, 0.2 parts of an inhibitor, 7.5 parts of the ceramifiable emulsion foaming agent, 15 parts of the functionalized ceramic filler, and 1.8 parts of a heat-resistant additive $SnO_2$ were placed in a planetary stirring tank to obtain a rubber material A, a cold circulation system was turned on to control a temperature of the rubber material A at 20° C., and the rubber material A was stirred at a speed of 1,300 rad/min for 25 min to obtain a base rubber A. The inhibitor was a silylene-propargyl compound with a structural formula as follows:

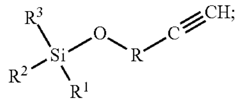

$R^1$, $R^2$, and $R^3$ were ethyl, and R was cyclohexyl.

Step (2), 50 parts of the hydroxyl-terminated polydimethylsiloxane with a viscosity of 18,000 mPa·s, 25 parts of the vinyl-terminated polydimethylsiloxane with a viscosity of 30,000 mPa·s, 30 parts of a hydrogen-containing silicone oil with a hydrogen content of 0.9%, 15 parts of the functionalized low-melting glass powder, and 4.5 parts of the functionalized hexagonal boron nitride were placed in the planetary stirring tank to obtain a rubber material B, a cold circulation system was turned on to control a temperature of the rubber material B at 16° C., and the rubber material B was stirred at a speed of 1,500 rad/min for 25 min to obtain a base rubber B.

Step (3), the base rubber B was transferred to the base rubber A to obtain a mixed rubber, the cold circulation system was turned on, and the mixed rubber was stirred at a speed of 5,000 rad/min for 100 s; an obtained mixed rubber was transferred to a mold, vulcanization was conducted at a room temperature for 10 min, followed by after vulcanization in an oven at 62° C. for 1.5 h to obtain the RTV silicone rubber foam with ablation resistance and high-efficiency heat insulation.

Example 9

A vinyltrimethoxysilane coupling agent was grafted onto montmorillonite, kaolin, wollastonite, and halloysite at a weight ratio of 1:1:1:1 to obtain a functionalized ceramic filler: 0.3 parts of the vinyltrimethoxysilane coupling agent was added to a 75% ethanol aqueous solution, and a resulting mixture was adjusted to a pH value of 3.5 with glacial acetic acid at 75° C. to fully hydrolyze the silane coupling agent; 2 parts of the montmorillonite, 2 parts of the kaolin, 2 parts of the wollastonite, and 2 parts of the halloysite were added and treated for 5.5 h, adjusted to a pH value of 9.4 with ammonia water, washed with ethanol, and then dried to obtain the functionalized ceramic filler.

The vinyltris(β-methoxyethoxy)silane coupling agent was grafted onto a glass powder with a melting point of 380° C. to obtain a functionalized low-melting glass powder: 0.3 parts of the vinyltris(β-methoxyethoxy)silane coupling agent was added to a 75% ethanol aqueous solution, and a resulting mixture was adjusted to a pH value of 3.5 with glacial acetic acid at 75° C. to fully hydrolyze the silane coupling agent; 10 parts of the glass powder was added and treated for 5.5 h, adjusted to a pH value of 9.4 with ammonia water, washed with ethanol, and then dried to obtain the functionalized low-melting glass powder.

Hexagonal boron nitride was treated at a high temperature of 1,080° C. for 1 h, cooled, and washed with deionized water to obtain hydroxyl-modified hexagonal boron nitride.

The vinyltrimethoxysilane coupling agent was grafted onto the hydroxyl-modified hexagonal boron nitride to obtain functionalized hexagonal boron nitride: 0.1 parts of the vinyltrimethoxysilane coupling agent was added to a 75% ethanol aqueous solution, and a resulting mixture was adjusted to a pH value of 3.5 with glacial acetic acid at 75° C. to fully hydrolyze the silane coupling agent: 4 parts of the hydroxyl-modified hexagonal boron nitride was added and treated for 5.5 h, adjusted to a pH value of 9.4 with ammonia water, washed with ethanol, and then dried to obtain the functionalized hexagonal boron nitride.

11 parts of Span 80 and 100 parts of hydroxyl-terminated polydimethylsiloxane with a viscosity of 35,000 mPa·s were dissolved by heating in a water bath and mixed uniformly, and 60 parts of a glass powder with a melting point of 820° C. 10 parts of montmorillonite, and 20 parts of hydroxyl-modified hexagonal boron nitride were added into an obtained mixture and mixed uniformly to obtain a ceramifiable emulsion foaming agent.

An RTV silicone rubber foam with ablation resistance and high-efficiency heat insulation was prepared as follows:

Step (1), 50 parts of the hydroxyl-terminated polydimethylsiloxane with a viscosity of 15,000 mPa s, 22 parts of the vinyl-terminated polydimethylsiloxane with a viscosity of 50,000 mPa s, 1.3 parts of a Karstedt's platinum catalyst $C_{24}H_{54}O_3PtSi_6$ with a concentration of 2,400 ppm, 0.1 parts of an inhibitor, 5.5 parts of the ceramifiable emulsion foaming agent, 8 parts of the functionalized ceramic filler, and 2 parts of a heat-resistant additive $Al_2O_3$ were placed in a planetary stirring tank to obtain a rubber material A, a cold circulation system was turned on to control a temperature of the rubber material A at 15° C., and the rubber material A was stirred at a speed of 1,400 rad/min for 24 min to obtain a base rubber A. The inhibitor was a silylene-propargyl compound with a structural formula as follows:

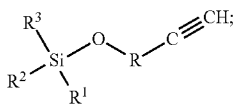

$R^1$, $R^2$, and $R^3$ were methyl, and R was isopropyl.

Step (2), 50 parts of the hydroxyl-terminated polydimethylsiloxane with a viscosity of 15,000 mPa·s, 20 parts of the vinyl-terminated polydimethylsiloxane with a viscosity of 20,000 mPa·s, 28 parts of a hydrogen-containing silicone oil with a hydrogen content of 0.7%, 10 parts of the functionalized low-melting glass powder, and 4 parts of the functionalized hexagonal boron nitride were placed in the planetary stirring tank to obtain a rubber material B, a cold circulation system was turned on to control a temperature of the rubber material B at 20° C., and the rubber material B was stirred at a speed of 1,600 rad/min for 24 min to obtain a base rubber B.

Step (3), the base rubber B was transferred to the base rubber A to obtain a mixed rubber, the cold circulation system was turned on, and the mixed rubber was stirred at a speed of 4,800 rad/min for 80 s; an obtained mixed rubber was transferred to a mold, vulcanization was conducted at a room temperature for 12 min, followed by after vulcanization in an oven at 60° C. for 2 h to obtain the RTV silicone rubber foam with ablation resistance and high-efficiency heat insulation.

Comparative Example 1

In step (1) of Example 1, 5 parts of the ceramifiable emulsion foaming agent were replaced with 1.1 part of a glass powder with a melting point of 900° C., 0.8 part of montmorillonite, and 0.3 part of hydroxyl-modified hexagonal boron nitride. Other processing conditions and parameter were identical with those in Example 1.

Comparative Example 2

In step (2) of Example 1, 3 parts of the functionalized low-melting glass powder was replaced with 3 parts of a glass powder with a melting point of 900° C. Other processing conditions and parameter were identical with those in Example 1.

Comparative Example 3

In Example 1, 40 parts of a glass powder with a melting point of 900° C. in the ceramifiable emulsion foaming agent was replaced with 40 parts of a glass powder with a melting point of 500° C. Other processing conditions and parameter were identical with those in Example 1.

Comparative Example 4

In Example 1, 3 parts of the functionalized ceramic filler in step (1) was replaced with 3 parts of montmorillonite, and 1 part of the functionalized hexagonal boron nitride in step (2) was replaced with 1 part of hexagonal boron nitride. Other processing conditions and parameter were identical with those in Example 1.

Comparative Example 5

In the step (3) of Example 1, the material A was transferred to the material B, and stirred at 1,000 rad/min for 2 min. Other processing conditions and parameter were identical with those in Example 1.

Comparative Example 6

In Example 1, the hydroxyl-modified hexagonal boron nitride was removed from the ceramifiable emulsion foaming agent, and the functionalized hexagonal boron nitride was removed in step (2). Other processing conditions and parameter were identical with those in Example 1.

The samples of Examples 1 to 9 and Comparative Example 2 were tested, and the thickness of each tested samples was 20 mm. After the samples of Examples 1 to 9 were attacked by a butane flame at 1,300° C. for 30 min, the samples still had a complete structure, an excellent heat insulation effect, and a temperature on the back side maintained at about 170° C. However, the comparative example was not assembled in situ by the filler, and the sample could not form a complete ceramic structure when the sample was attacked by the flame, and the temperature on the back surface reached 450° C.

Foam materials were subjected to performance tests with reference to national standards. The apparent density test standard was GB/T6343-2009, the flame retardancy test standard was ISO4589-2:19%, the LOI test standard was GB/T10707-2008, the compressive strength of ceramic body test standard was GB/T1039-92, and the closed porosity test standard was GB/T10799-2008. Performance test results were show in the following table.

| | Apparent density ($g/cm^3$) | Flame retardancy | LOI (%) | Compressive strength of ceramic body (MPa) | Closed porosity |
|---|---|---|---|---|---|
| Example 1 | 0.21 | FV0 | 29.5 | 5.0 | 95 |
| Example 2 | 0.24 | FV0 | 30.1 | 5.1 | 93 |
| Example 3 | 0.19 | FV0 | 30.4 | 4.5 | 96 |
| Example 4 | 0.20 | FV0 | 29.8 | 4.8 | 94 |
| Example 5 | 0.25 | FV0 | 31.2 | 4.6 | 93 |
| Example 6 | 0.22 | FV0 | 31.4 | 4.9 | 95 |
| Example 7 | 0.22 | FV0 | 30.6 | 4.7 | 94 |
| Example 8 | 0.21 | FV0 | 30.2 | 5.0 | 93 |
| Example 9 | 0.23 | FV0 | 31.0 | 4.6 | 95 |
| Comparative Example 1 | 0.35 | FV1 | 25.4 | 3.1 | 78 |
| Comparative Example 2 | 0.22 | FV1 | 26.1 | 2.9 | 90 |
| Comparative Example 3 | 0.20 | FV1 | 25.6 | 3.3 | 92 |
| Comparative Example 4 | 0.25 | FV1 | 26.5 | 3.5 | 85 |
| Comparative Example 5 | 0.32 | FV1 | 24.8 | 2.7 | 81 |
| Comparative Example 6 | 0.19 | FV0 | 29.1 | 1.8 | 91 |

What is claimed is:

1. A silicone rubber foam with ablation resistance and high-efficiency heat insulation, comprising the following components in parts by weight for blending and foaming:

| | |
|---|---|
| a hydroxyl-terminated polydimethylsiloxane | 100 parts; |
| a vinyl-terminated polydimethylsiloxane | 20 parts to 60 parts; |
| a hydrogen-containing silicone oil | 20 parts to 40 parts; |
| a catalyst | 0.4 parts to 1.5 parts; |
| an inhibitor | 0.1 parts to 0.5 parts; |
| a ceramifiable emulsion foaming agent | 5 parts to 10 parts; |
| a functionalized ceramic filler | 3 parts to 15 parts; |
| a functionalized low-melting glass powder | 3 parts to 15 parts; |
| a functionalized hexagonal boron nitride | 1 part to 5 parts; and |
| a heat-resistant additive | 1 part to 3 parts; |

wherein the ceramifiable emulsion foaming agent is a mixture of the following substances in parts by weight:

| | |
|---|---|
| the hydroxyl-terminated polydimethylsiloxane | 100 parts; |
| an emulsifier | 5 parts to 15 parts; |
| a high-melting glass powder | 10 parts to 70 parts; |
| a ceramic filler | 10 parts to 70 parts; and |
| a hydroxyl-modified hexagonal boron nitride | 10 parts to 20 parts; and |

wherein:

the hydroxyl-terminated polydimethylsiloxane of the ceramifiable emulsion foaming agent has a viscosity of 1,500 mPa·s to 50,000 mPa·s;

the emulsifier is one or more selected from the group consisting of sorbitan monolaurate, sorbitan monostearate, and sorbitan monooleate;

the high-melting glass powder has a melting point of 650° C. to 900° C.;

the ceramic filler is one or more selected from the group consisting of montmorillonite, kaolin, wollastonite, and halloysite;

the hydroxyl-modified hexagonal boron nitride is obtained by treating a hexagonal boron nitride at a high temperature of 900° C. to 1,200° C., cooling, and washing with deionized water; and wherein the emulsifier and the hydroxyl-terminated polydimethylsiloxane are dissolved by heating in a water bath and mixed uniformly, and the high-melting glass powder, the ceramic filler, and the hydroxyl-modified hexagonal boron nitride are added into the obtained mixture and mixed uniformly to obtain the ceramifiable emulsion foaming agent.

2. The silicone rubber foam with the ablation resistance and the high-efficiency heat insulation according to claim 1, wherein the hydroxyl-terminated polydimethylsiloxane of the silicone rubber foam has a viscosity of 5,000 mPa·s to 20,000 mPa·s; the vinyl-terminated polydimethylsiloxane has a viscosity of 20,000 mPa·s to 50,000 mPa·s; and the hydrogen-containing silicone oil has a hydrogen content of 0.5% to 1.6%.

3. The silicone rubber foam with the ablation resistance and the high-efficiency heat insulation according to claim 1, wherein the catalyst is a Karstedt's platinum catalyst with a chemical formula of $C_{24}H_{54}O_3PtSi_6$ and a platinum concentration of 2,000 ppm to 5,000 ppm.

4. The silicone rubber foam with the ablation resistance and the high-efficiency heat insulation according to claim 1, wherein the inhibitor is a silylene-propargyl compound with a structural formula as follows:

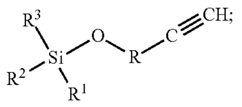

$R^1$, $R^2$, and $R^3$ each are selected from the group consisting of H, methyl, and ethyl, and R is selected from the group consisting of cyclohexyl and isopropyl.

5. The silicone rubber foam with the ablation resistance and the high-efficiency heat insulation according to claim 1, wherein:

the functionalized ceramic filler is obtained by grafting the same ceramic filler as used for making the ceramifiable emulsion foaming agent with a silane coupling agent;

the functionalized low-melting glass powder is obtained by grafting a low-melting glass powder with the silane coupling agent, and the low-melting glass powder has a melting point of 350° C. to 600° C.; and the functionalized hexagonal boron nitride is obtained by grafting the same hydroxyl-modified hexagonal boron nitride as used for making the ceramifiable emulsion foaming agent with the silane coupling agent.

6. The silicone rubber foam with the ablation resistance and the high-efficiency heat insulation according to claim 5, wherein the silane coupling agent is selected from the group consisting of vinyltriethoxysilane, vinyltrimethoxysilane, and vinyltris (β-methoxyethoxy) silane.

7. The silicone rubber foam with the ablation resistance and the high-efficiency heat insulation according to claim 1, wherein the heat-resistant additive is one or more selected from the group consisting of $SnO_2$, $Fe_2O_3$, $CeO_2$, and $Al_2O_3$.

8. A preparation method of the silicone rubber foam with the ablation resistance and the high-efficiency heat insulation according to claim 1, comprising the following steps:

step (1), placing 50 parts by weight of the hydroxyl-terminated polydimethylsiloxane, 10 parts to 30 parts by weight of the vinyl-terminated polydimethylsiloxane, 0.4 parts to 1.5 parts by weight of the catalyst, 0.1 parts to 0.5 parts by weight of the inhibitor, 5 parts to 10 parts by weight of the ceramifiable emulsion foaming agent, 3 parts to 15 parts by weight of the functionalized ceramic filler, and 1 part to 3 parts by weight of the heat-resistant additive in a planetary stirring tank to obtain a rubber material A, turning on a cold circulation system to control a temperature of the rubber material A at 15° C. to 25° C., and stirring at a speed of 1,000 rad/min to 2,000 rad/min for 20 min to 30 min to obtain a base rubber A;

step (2), placing 50 parts by weight of the hydroxyl-terminated polydimethylsiloxane, 10 parts to 30 parts by weight of the vinyl-terminated polydimethylsiloxane, 20 parts to 40 parts by weight of the hydrogen-containing silicone oil, 3 parts to 15 parts by weight of the functionalized low-melting glass powder, and 1 part to 5 parts by weight of the functionalized hexagonal boron nitride in the planetary stirring tank to obtain a rubber material B, turning on the cold circulation system to control a temperature of the rubber material B at 15° C. to 25° C., and stirring at a speed of 1,000 rad/min to 2,000 rad/min for 20 min to 30 min to obtain a base rubber B;

step (3), transferring the base rubber B to the base rubber A to obtain a mixed rubber, turning on the cold circulation system, and stirring the mixed rubber at a speed of 4,000 rad/min to 6,000 rad/min for 1 min to 2 min; transferring an obtained mixed rubber to a mold, conducting vulcanization at a room temperature for 10 min to 20 min, followed by after-vulcanization in an oven at 60° C. to 80° C. for 1 h to 2 h to obtain the silicone rubber foam with the ablation resistance and the high-efficiency heat insulation.

9. The preparation method according to claim 8, wherein the hydroxyl-terminated polydimethylsiloxane of the silicone rubber foam has a viscosity of 5,000 mPa·s to 20,000 mPa·s; the vinyl-terminated polydimethylsiloxane has a viscosity of 20,000 mPa·s to 50,000 mPa·s; and the hydrogen-containing silicone oil has a hydrogen content of 0.5% to 1.6%.

10. The preparation method according to claim 8, wherein the catalyst is a Karstedt's platinum catalyst with a chemical formula of $C_{24}H_{54}O_3PtSi_6$ and a platinum concentration of 2,000 ppm to 5,000 ppm.

11. The preparation method according to claim 8, wherein the inhibitor is a silylene-propargyl compound with a structural formula as follows:

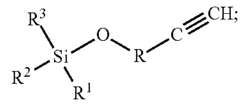

$R^1$, $R^2$, and $R^3$ each are selected from the group consisting of H, methyl, and ethyl, and R is selected from the group consisting of cyclohexyl and isopropyl.

* * * * *